United States Patent
Jeong et al.

(10) Patent No.: US 7,999,604 B2
(45) Date of Patent: Aug. 16, 2011

(54) BOOST CIRCUIT CAPABLE OF CONTROLLING INRUSH CURRENT AND IMAGE SENSOR USING THE BOOST CIRCUIT

(75) Inventors: Young Kyun Jeong, Hwaseong-si (KR); Young Tae Jang, Pyeongtaek-si (KR); Kyoung Min Koh, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 137 days.

(21) Appl. No.: 12/320,218

(22) Filed: Jan. 22, 2009

(65) Prior Publication Data
US 2009/0184239 A1 Jul. 23, 2009

(30) Foreign Application Priority Data
Jan. 22, 2008 (KR) .................. 10-2008-0006546

(51) Int. Cl.
*G05F 1/10* (2006.01)
(52) U.S. Cl. ...................................... 327/536
(58) Field of Classification Search .......... 327/535, 327/536, 537
See application file for complete search history.

(56) References Cited

U.S. PATENT DOCUMENTS

| | | | | |
|---|---|---|---|---|
| 5,563,779 A * | 10/1996 | Cave et al. | ...................... | 363/59 |
| 6,798,274 B2 * | 9/2004 | Tanimoto | ...................... | 327/536 |
| 7,116,156 B2 * | 10/2006 | Myono et al. | .................. | 327/536 |
| 7,250,810 B1 * | 7/2007 | Tsen et al. | ...................... | 327/536 |
| 7,365,585 B2 * | 4/2008 | Fort et al. | ...................... | 327/170 |
| 7,554,385 B2 * | 6/2009 | Ishida | ............................ | 327/536 |
| 7,667,529 B2 * | 2/2010 | Consuelo et al. | ............. | 327/536 |
| 7,683,700 B2 * | 3/2010 | Huynh et al. | .................. | 327/536 |

FOREIGN PATENT DOCUMENTS

| | | |
|---|---|---|
| JP | 2002-149247 | 5/2002 |
| JP | 2002-209145 | 7/2002 |
| KR | 10-2003-0047925 | 6/2003 |
| KR | 10-0660870 | 12/2006 |

* cited by examiner

*Primary Examiner* — Jeffrey S Zweizig
(74) *Attorney, Agent, or Firm* — Harness, Dickey & Pierce, P.L.C.

(57) ABSTRACT

In one embodiment, the boost circuit includes a boost unit configured to perform a charge pumping operation based on a control signal. A controller is configured to control the boost unit such that the boost unit performs a lesser charge pumping operation from an initial time when power is supplied to the boost circuit until a desired time than after the desired time.

16 Claims, 7 Drawing Sheets

BOOST CIRCUIT CAPABLE OF CONTROLLING INRUSH CURRENT AND IMAGE SENSOR USING THE BOOST CIRCUIT

PRIORITY INFORMATION

This application claims the benefit of Korean Patent Application No. 10-2008-0006546, filed on 22 Jan. 2008, in the Korean Intellectual Property Office, the disclosure of which is incorporated herein in its entirety by reference.

BACKGROUND

1. Technical Field

The inventive concept relates to a boost circuit and an image sensor, and more particularly, to a boost circuit capable of controlling inrush current and an image sensor using a boosting voltage output from the boost circuit.

2. Description of Related Art

Recently, as electronic products with a photography function such as camcorders, digital cameras, and mobile phones have been made compact and slim, the size of a power supply unit, for example, a battery, has been reduced. Accordingly, a load on the power supply unit which supplies power to an image sensor included in these electronic products increases so that it is difficult to secure a sufficient power margin of the power supply unit.

To reduce the production costs of electronic product sets, power management units and various power supply units are integrally used. Accordingly, inrush current increases during driving each sub-block so that supply of power to other sub-blocks using the same power source from the power supply unit may be unstable. When the supply of power is unstable, a data hold error may be generated in a logic block and a characteristic error of settling time may occur in an analog block, so that the overall system may malfunction.

In particular, to prevent characteristic deterioration according to the miniaturization of the pitch of a pixel of an image sensor, a boost circuit is used to generate a high voltage over a power voltage. Using the boost circuit may cause the problem of inrush current. Generally, the boost circuit uses a voltage boosting regulator including an internal capacitor and an external capacitor for initial charge. The inrush current during the initial charge may deteriorate the function and characteristic during driving of the electronic product set and image sensor.

Also, to cope with an increase in load according to an increase in resolution of the image sensor, an increase in capacity of the capacitor for stabilization of output voltage of the boost circuit is needed. The amount of inrush current may be further increased to charge the capacitor in the initial stage when supply of power starts.

Accordingly, in a typical boost circuit, a considerable amount of inrush current is generated to charge the capacitor of the boost circuit in the initial stage when supply of power starts.

SUMMARY

The present invention relates to a boost circuit, an image sensor including the boost circuit, and/or a method of generating a boost voltage in a boost circuit.

In one embodiment, the boost circuit includes a boost unit configured to perform a charge pumping operation based on a control signal. A controller is configured to control the boost unit such that the boost unit performs a lesser charge pumping operation from an initial time when power is supplied to the boost circuit until a desired time than after the desired time.

In one embodiment, the boost circuit further includes a regulation unit configured to selectively regulate the boosted voltage based on a regulating control signal. The controller is configured to generate the regulating control signal such that the regulation unit does not regulate the boosted voltage before the desired time and does regulate the boosted voltage after the desired time.

In one embodiment, the image sensor includes a boost circuit such as described above, a drive signal generation unit configured to generates a plurality of drive signals, and a drive buffer unit having a plurality of buffers. Each buffer is configured to buffer a corresponding drive signal, an at least one of the buffers is configured to receive the boosted voltage output from the boost circuit. A pixel array has a plurality of pixels configured to be driven in response to the buffered drive signals.

In one embodiment, a method for generating a boosted voltage in a boost circuit includes performing a first charge pumping operation to generate the boosted voltage from an initial time when power is supplied to the boost circuit until a desired time, and performing a second charge pumping operation to generate the boosted voltage after the desired time. The second charge pumping operation is a greater charge pumping operation than the first charge pumping operation.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
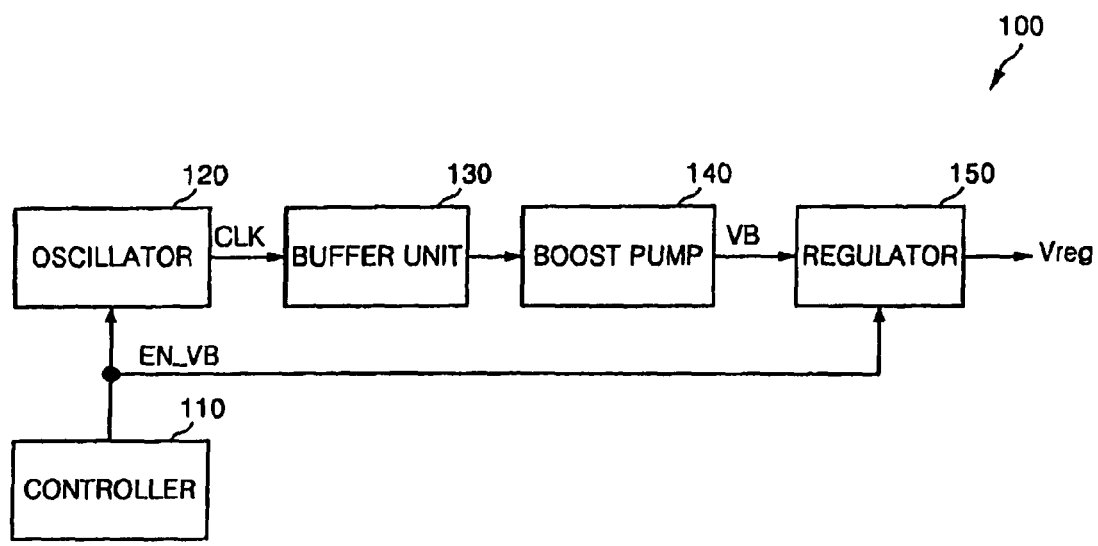
FIG. 1 is a block diagram of a boost circuit according to a related art.

Example embodiments will now be described more fully with reference to the accompanying drawings. However, example embodiments may be embodied in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

It will be understood that when an element or layer is referred to as being "on", "connected to" or "coupled to" another element or layer, it may be directly on, connected or coupled to the other element or layer, or intervening elements or layers may be present. In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Thus, a first element, component, region, layer or section discussed below could be termed a second element, component, region, layer or section without departing from the teachings of the example embodiments.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
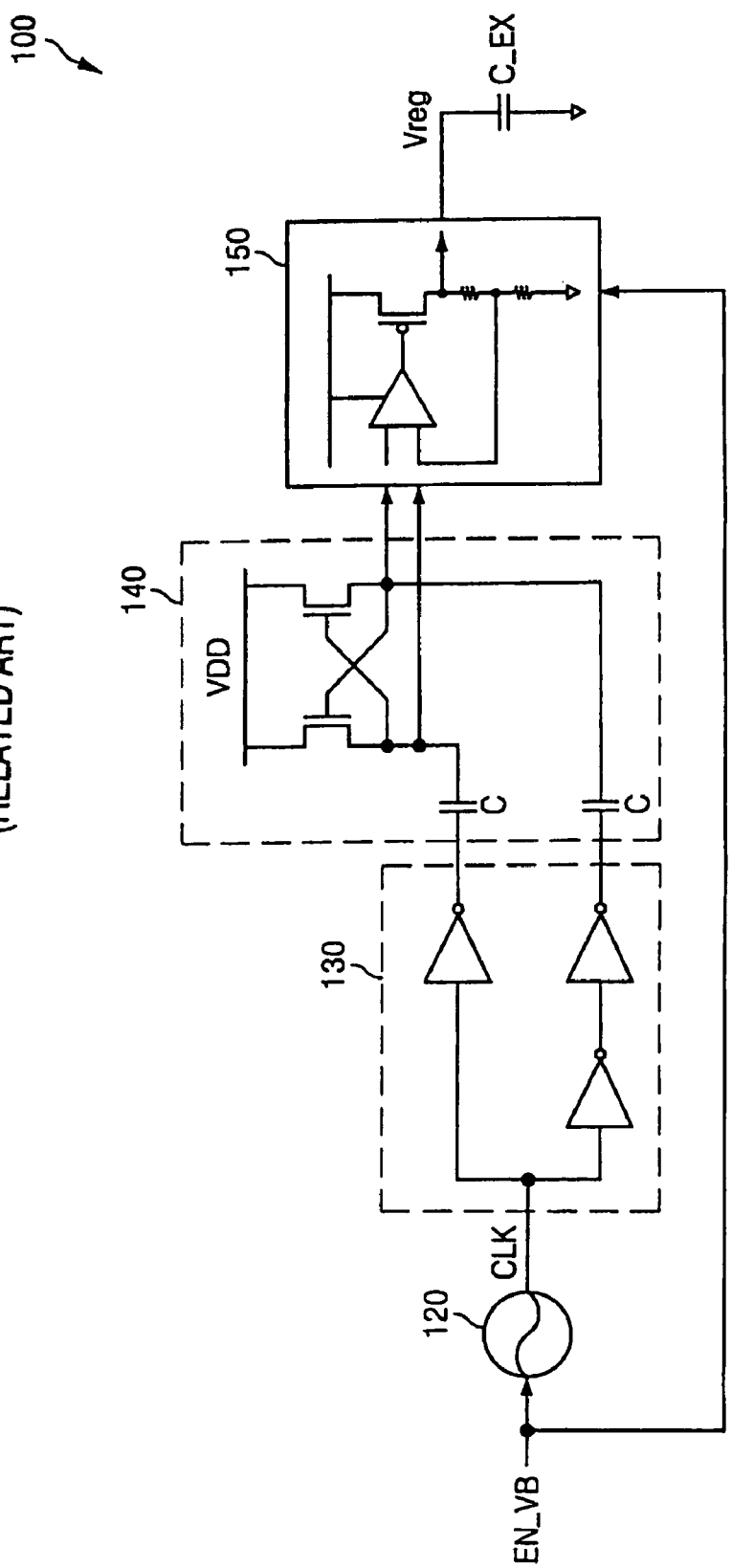
FIG. 2 is a circuit diagram of the boost circuit of FIG. 1.

FIG. 1 is a block diagram of a boost circuit 100 according to a related art. FIG. 2 is a circuit diagram of the boost circuit 100 of FIG. 1. Referring to FIGS. 1 and 2, the boost circuit 100 includes a controller 110, an oscillator 120, a buffer unit 130, a boost pump 140, and a regulator 150.

The controller 110 generates an enable signal EN_VB for driving the boost circuit 100. The oscillator 120 in response to the enable signal EN_VB generates a clock CLK having a desired (or, alternatively a predetermined) frequency. The buffer unit 130 receives and buffers the clock CLK or inverts and buffers the inverted clock CLK. The boost pump 140 includes pumping capacitors C performing a charge pumping operation in response to the buffered clock and the buffered inverted clock. The regulator 150 in response to an output signal of the boost pump 140 outputs a voltage Vreg having a constant voltage level. The output voltage Vreg of the regulator 150 charges an external capacitor C_EX.

In the initial stage, when supply of power starts, a considerable amount of inrush current is generated to charge the pumping capacitors C and the external capacitor C_EX.

Figure 3:
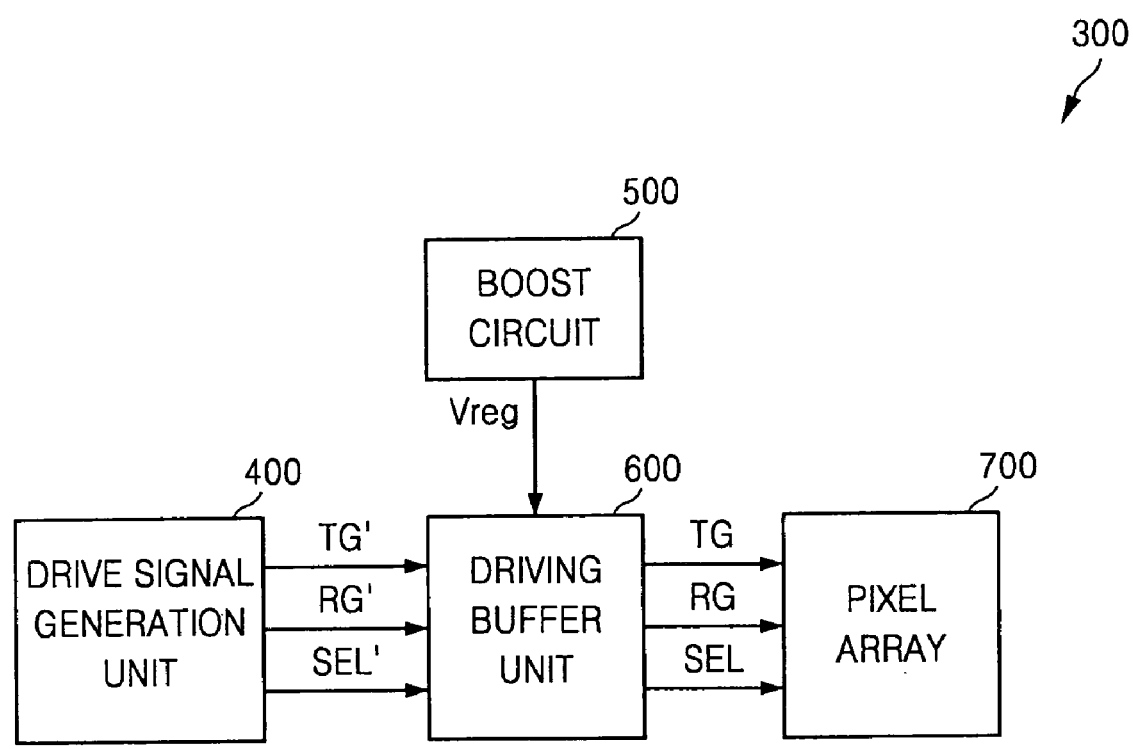
FIG. 3 is a block diagram of an image sensor according to an exemplary embodiment.

FIG. 3 is a block diagram of an image sensor 300 according to an exemplary embodiment. Referring to FIG. 3, the image sensor 300 includes a drive signal generation unit 400, a boost circuit 500, a driving buffer unit 600, and a pixel array 700. The drive signal generation unit 400 generates a plurality of drive signals TG', RG', and SEL', of which usages will be described later. The boost circuit 500 performs a charge pumping operation in the initial stage when supply of power starts so as to generate a boost voltage VB having a high voltage level, higher than a power voltage. As the charge pumping operation is performed, an abrupt increase of inrush current may be prevented. This is made possible by controlling the number of pumping capacitors performing the charge pumping operation, which will be described in detail with reference to FIG. 6. The boost voltage VB having a constant voltage level may be changed into a regulated voltage Vreg if the boost circuit includes a voltage regulator.

The driving buffer unit 600 buffers the drive signals TG', RG', and SEL'. The driving buffer unit 600 may use the boost voltage VB or the regulated voltage Vreg output from the boost circuit 500 as a power supply source. The pixel array 700 may include a plurality of pixels (not shown) driven in response to the buffered drive signals TG, RG, and SEL.

Figure 4:
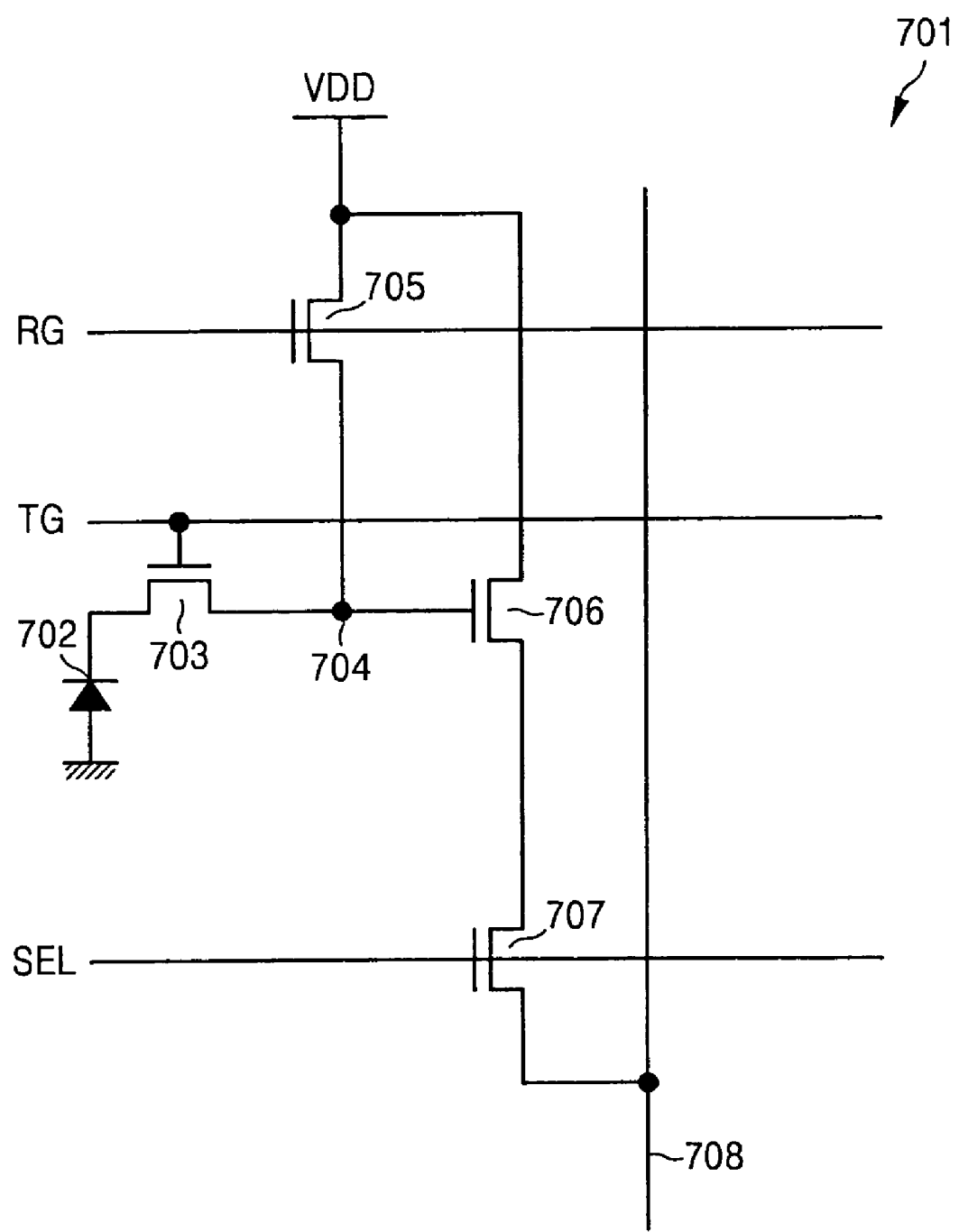
FIG. 4 is a circuit diagram of a unit pixel included in a pixel array of the image sensor of FIG. 3.

FIG. 4 is a circuit diagram of a unit pixel 701 included in the pixel array 700 of the image sensor 300 of FIG. 3. Referring to FIG. 4, the unit pixel 701 of a 4T (four transistors) type includes a photodiode 702, a floating diffusion region 704, and four transistors 703, 705, 706, and 707. Although the image sensor 300 includes a plurality of unit pixels 701 arranged in a matrix format, since the structures and operations of the unit pixels 701 are the same, only one of the unit pixels 701 is illustrated in FIG. 4 for convenience of explanation.

The photodiode 702 generates photons in response to externally incident light. The transfer transistor 703 in response to a transmission signal TG transmits the photons generated by the photodiode 702 to the floating diffusion region 704. The reset transistor 705 in response to a reset signal RG resets the floating diffusion region 704 to a desired (or, alternatively a predetermined) voltage VDD. The drive transistor 706 in response to a voltage level of the floating diffusion region 704 outputs a variant voltage via a vertical signal line 708. The selection transistor 707 in response to the selection signal SEL selects a unit pixel to output a signal.

Recently, due to the increasing demand for a high resolution image sensor and the development of a CMOS manufacturing process, the size of a unit pixel of an image sensor is rapidly decreasing. As the unit pixel size, decreases, the size of a photodiode decreases as well. This may cause the deterioration of a characteristic of the photodiode. To compensate for the characteristic deterioration, the voltage levels of the drive signals TG, RG, and SEL are boosted over the conventional power voltage.

Figure 5:
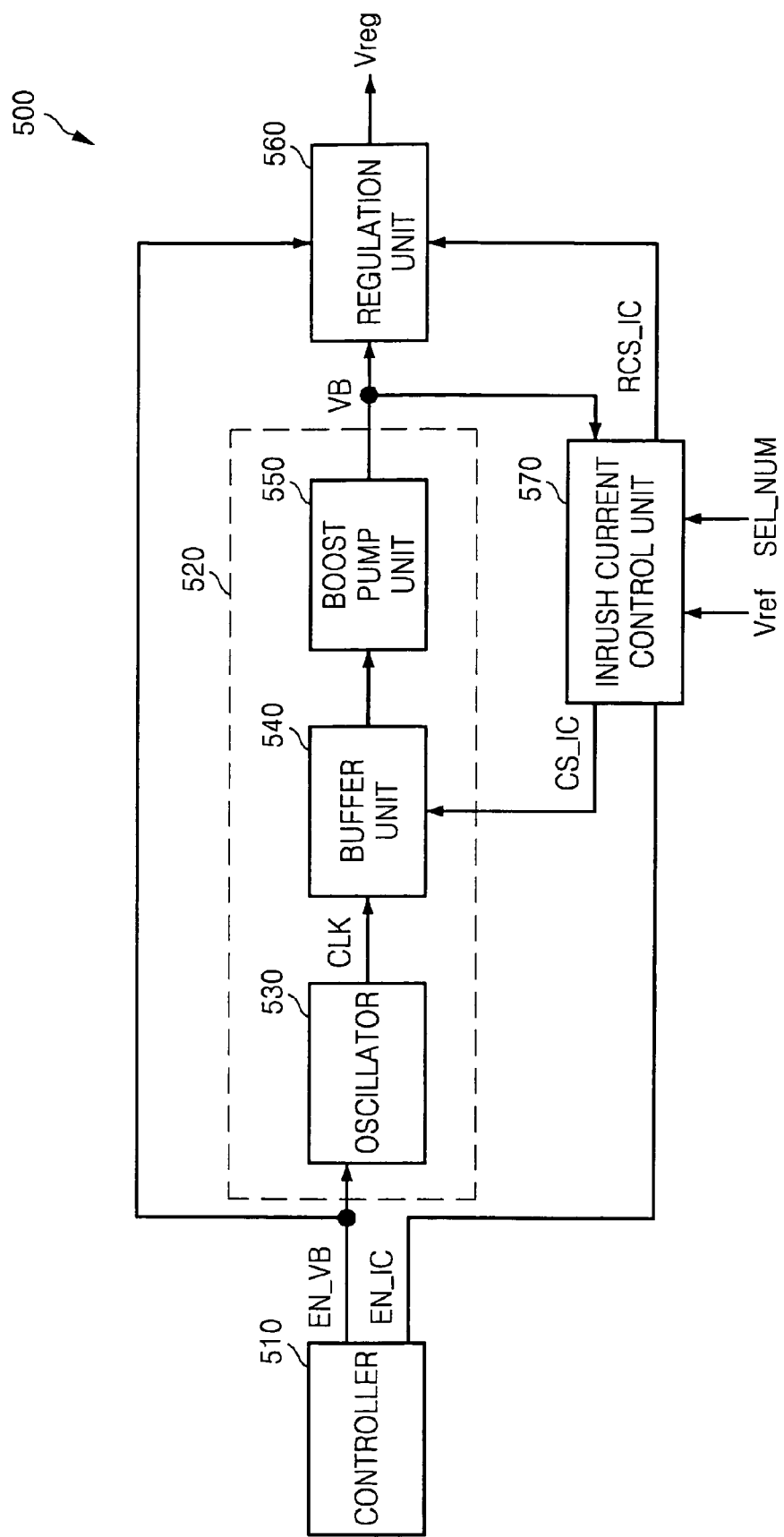
FIG. 5 is a block diagram of the boost circuit of FIG. 3.
Figure 6:
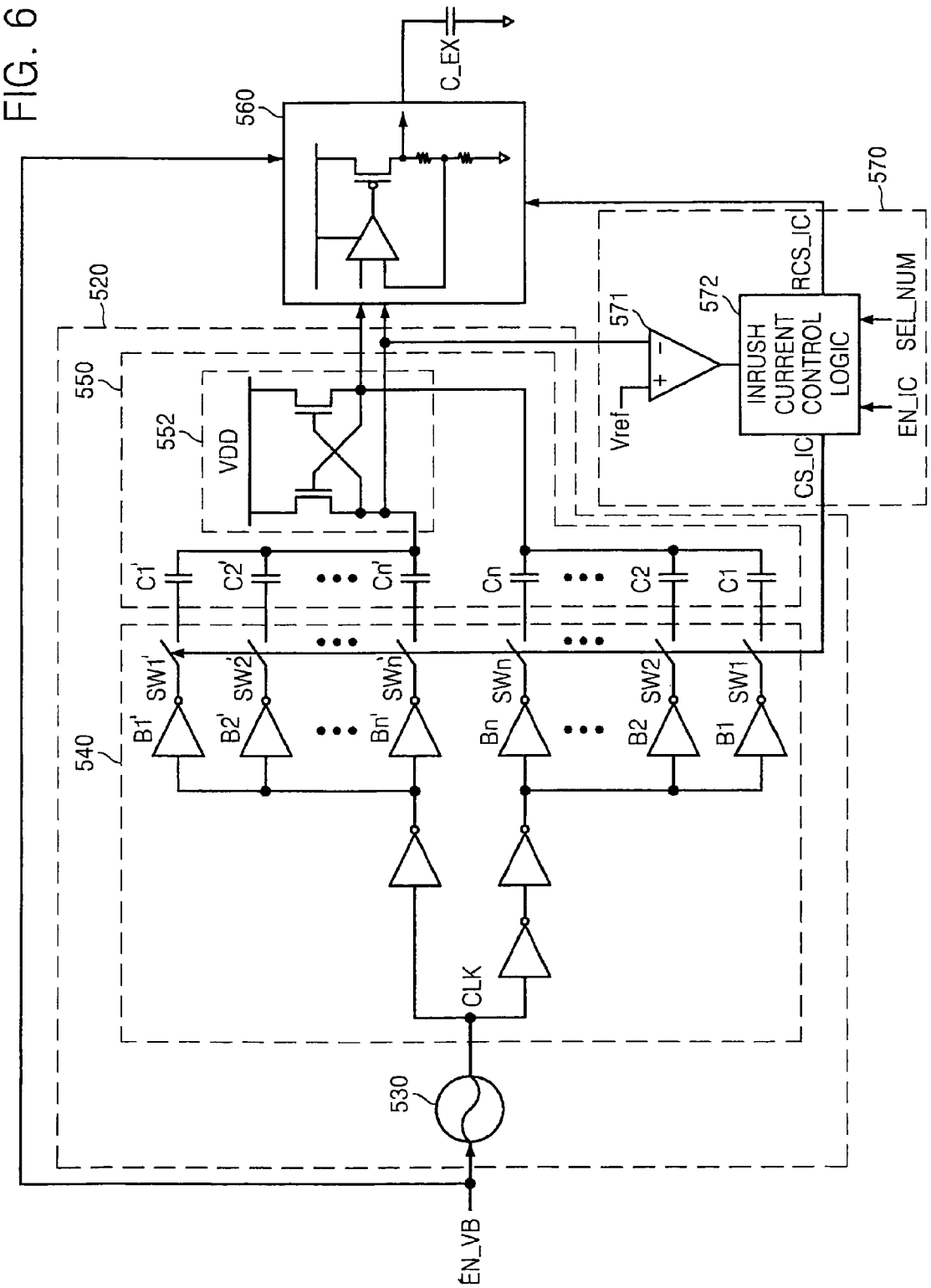
FIG. 6 is a circuit diagram of the boost circuit of FIG. 3.

FIG. 5 is a block diagram of the boost circuit 500 of FIG. 3, and FIG. 6 is a circuit diagram of the boost circuit 500 of FIG. 3. Referring to FIGS. 5 and 6, the boost circuit 500 includes a controller 510, a boosting unit 520, a regulation unit 560, and an inrush current control unit 570.

The controller 510 generates an enable signal EN_VB and an inrush current control enable signal EN_IC, respectively, for driving the boosting unit 520, the regulation unit 560 and the inrush current control unit 570. The boosting unit 520 is driven in response to an enable signal EN_VB from the controller 510 and generates a boost voltage VB by performing a charge pumping operation in response to an inrush current control signal CS_IC from the inrush current control unit 570.

The regulation unit 560 is enabled in response to the enable signal EN_VB from the controller 510 and the inrush current regulating control signal RCS_IC from the inrush current control unit 570 and generates a regulated voltage Vreg having a constant voltage level corresponding to the boost voltage VB. The regulation unit 560 may be set to start a regulating operation when the inrush current regulating control signal RCS_IC is disabled, for example, transitions from a high level to a low level.

Also, the regulation unit 560 may be deactivated from a time point when power is supplied to the boost circuit 500 in response to the enable signal EN_VB to a desired (or, alternatively a predetermined) time point, and then activated after the desired time point. The desired time point may be set by a user. In other words, the operation of the regulation unit 506 may be discontinued or not enabled during which the inrush current is controlled and resumed or enabled when the inrush current control ends. When the operation of the regulation unit 560 is disabled, a current path to the external capacitor C_EX is cut off so that the inrush current may be reduced, or the regulation unit 560 simply supplies the boost voltage VB. For example, the inrush current control unit 570 generates the regulating control signal RCS_IC such that the regulation unit 570 does not regulate the boosted voltage before the desired time and does not regulate the boosted voltage after the desired time.

The inrush current control unit 570 generates the inrush current control signal CS_IC and the inrush current regulating control signal RCS_IC in response to the inrush current control enable signal EN_IC, the boost voltage VB, and a reference voltage Vref.

The boost unit 520 includes an oscillator 530, a buffer unit 540, and a boost pump unit 550. The oscillator 530 in response to the enable signal EN_VB generates a clock CLK having a desired (or, alternatively a predetermined) frequency. The buffer unit 540 receives and inverts the clock CLK and buffers the clock CLK and the inverted clock and outputs selectively the buffered clock and the buffered inverted clock to the boost pump unit 550 in response to the inrush current control signal CS_IC. The boost pump unit 550 performs a charge pumping operation in response to the selectively buffered clock and buffered inverted clock.

The buffer unit 540 includes first and second plurality of buffers B1, B2, ..., Bn and B1', B2', ..., Bn' and first and second plurality of switching devices SW1, SW2, ..., SWn and SW1', SW2', ..., SWn'. Each of the buffers B1, B2, ..., Bn buffers the received clock, and each of the buffers B1', B2', ... Bn' buffers the inverted clock. Each of the switching devices SW1, SW2, ..., SWn in response to the inrush current control signal CS_IC selectively performs a switching operation in order to output the selectively buffered clock. Each of the switches SW1', SW2', ..., SWn' in response to the inrush current control signal CS_IC selectively performs a switching operation to output the buffered inverted clock.

For example, of the switching devices SW1, SW2, ..., SWn, and SW1', SW2', ..., SWn' only one corresponding pair of the switching devices from the first and second plurality of switching device (e.g., SW1 and SW1') may be closed in the initial stage in response to inrush current control signal CS_IC from the time point when the supply of power to the boost circuit 500 starts to a particular time point. All switching devices SW1, SW2, ..., SWn and SW1', SW2', ..., SWn' may be closed after the desired time point. Accordingly, the inrush current control unit 570 controls the boost unit 520 such that less than all of the plurality of pumping capacitors are used to perform the charge pumping operation from an initial time when power is supplied to the boost circuit until a desired time, and the inrush current control unit 570 controls the boost unit 520 such that a greater number of the plurality of pumping capacitors are used to perform the charge pumping operation after the desired time than before the desired time. Stated another way, the inrush current control unit 570 performs a lesser charge pumping operation from an initial time when power is supplied to the boost circuit 500 until a desired time than after the desired time.

Also, corresponding pairs of the switching devices SW1, SW2, ..., SWn and SW1', SW2', ..., SWn' may be closed one after the other, at a desired time interval, after the time point when the supply of power to the boost circuit 500 starts. Stated another way, one of the corresponding switch pairs may be closed at each interval such that the corresponding switch pairs are closed and then opened in sequence. In one embodiment, the inrush current control logic 572 may include one or more registers storing a bit sequence with each bit corresponding to a switch pair. At the start of power supply, the switch pairs corresponding to set bits in the first register are closed. After a desired time interval, the switch pairs corresponding to set bits in the second register are closed. This process continues until the particular time point. As will be appreciated, the inrush current control signal CS_IC may be a multi-bit signal with each bit corresponding to and controlling the open/closed state of the corresponding switch pairs. Accordingly, the bit sequence stored in a register may be output as the inrush current control signal CS_IC. However, this is mere example of driving of the switching devices SW1, SW2, ..., SWn and SW1', SW2', ..., SWn', and the scope of the present inventive is not limited thereto. That is, the corresponding pairs of switching devices may be closed in any desired pattern when the inrush current contros signal EN_IC is enabled in the initial stage in which supply of power starts. Since only part of the pumping capacitors C1, C2, ..., Cn and C1', C2', ..., Cn' in the boost pump unit 550 may perform the charge pumping operation, the amount of the inrush current may be reduced in the initial stage in which supply of power starts.

The buffers B1, B2, ..., Bn and B1', B2', ..., Bn' are parallelly connected to one another, and each of the buffers B1, B2, ..., Bn and B1', B2', ..., Bn' may be an inverting buffer buffering a signal corresponding to the buffered clock or the buffered inverted clock. Each of the switching devices SW1, SW2, ..., SWn may be connected to an output terminal of a corresponding one of the buffers B1, B2, ..., Bn. Also, each of the switching devices SW1, SW2, ..., SWn may be closed or open in response to the inrush current control signal CS_IC. Similarly, each of the switching devices SW1', SW2', ..., SWn' may be connected to an output terminal of a corresponding one of the buffers B1', B2', ..., Bn'. Also, each of the switching devices SW1', SW2', ..., SWn' may be closed or open in response to the inrush current control signal CS_IC.

Also, the switching devices SW1, SW2, ..., SWn and/or SW1', SW2', ..., SWn' may be before the corresponding one of the buffers B1, B2, ..., Bn and B1', B2', ..., Bn' instead of after the corresponding one of the buffers B1, B2, ..., Bn and B1', B2', ..., Bn'.

The boost pump unit 550 includes a plurality of pumping capacitors C1, C2, ..., Cn and C1', C2', ..., Cn' and an amplifier 552 having a cross-coupled input terminal. Each of the pumping capacitors C1, C2, ..., Cn and C1', C2', ..., Cn' performs a charge pumping operation in response to a corresponding signal of the buffered clock or the buffered inverted clock. The pumping capacitors C1, C2, ..., Cn are parallelly connected to one another and each of the pumping capacitors C1, C2, ..., Cn may be connected to a corresponding one of the switching devices SW1, SW2, ..., SWn. Similarly, the pumping capacitors C1', C2', ..., Cn' are parallelly connected to one another and each of the pumping capacitors C1', C2', ..., Cn' may be connected to a corresponding one of the switching devices SW1', SW2', ..., SWn'.

The inrush current control unit 570 includes a comparator 571 and an inrush current control logic 572. The comparator 571 receives and compares a reference voltage Vref and the boost voltage VB from the boost pump unit 550 and outputs a result of the comparison. For example, when the boost voltage VB is lower than the reference voltage Vref, the comparator 571 may output a comparison result having a first logic level, for example, a high level. Otherwise, a comparison result having a second logic level, for example, a low level, may be output.

The inrush current control logic 572 in response to the inrush current control enable signal EN_IC and the comparison result generates the inrush current control signal CS_IC and the inrush current regulating control signal RCS_IC. For example, the inrush current control logic 572 during enabling of the inrush current control enable signal EN_IC may activate the inrush current control signal CS_IC if the comparison result is a logic high level. The inrush current control signal CS_IC, may be deactivated if the comparison result is a low level. In other words, the inrush current control unit 570 in response to the inrush current control enable signal EN_IC controls the number of pumping capacitors performing pumping operation as described above from the time point when the supply of power to the boost circuit 500 starts to the desired time point (e.g., when the boosted voltage VB equals the reference voltage Vref).

Also the inrush current control unit 570 may activate the inrush current regulating control signal RCS_IC after the desired time point so that the regulating unit 560 starts to performing the regulating operation on the boosted voltage VB once this desired time point is reached. Also, when this desired time point is reached, the inrush current control logic 572 closes all of the switch pairs.

The inrush current control logic 572 may further or alternatively receive a selection signal SEL_NUM indicating the number of the pumping capacitors to perform a pumping operation in the initial stage when supply of power starts. In one embodiment, the selection signal SEL_NUM may program the registers in the inrush current control logic 572. In another embodiment, the selection signal SEL_NUM may replace the use of the registers, and be directly used in generating the inrush current control signal CS_IC. For example, the selection signal SEL_MUN may be supplied as the inrush current control signal CS_IC. More simply, the selection signal SEL_NUM may just indicate the number of pumping capacitors or corresponding switch pairs, and the inrush current control logic 572 closes that number of corresponding switch pairs. The number of the pumping capacitors may be previously determined by a user.

Figure 7:
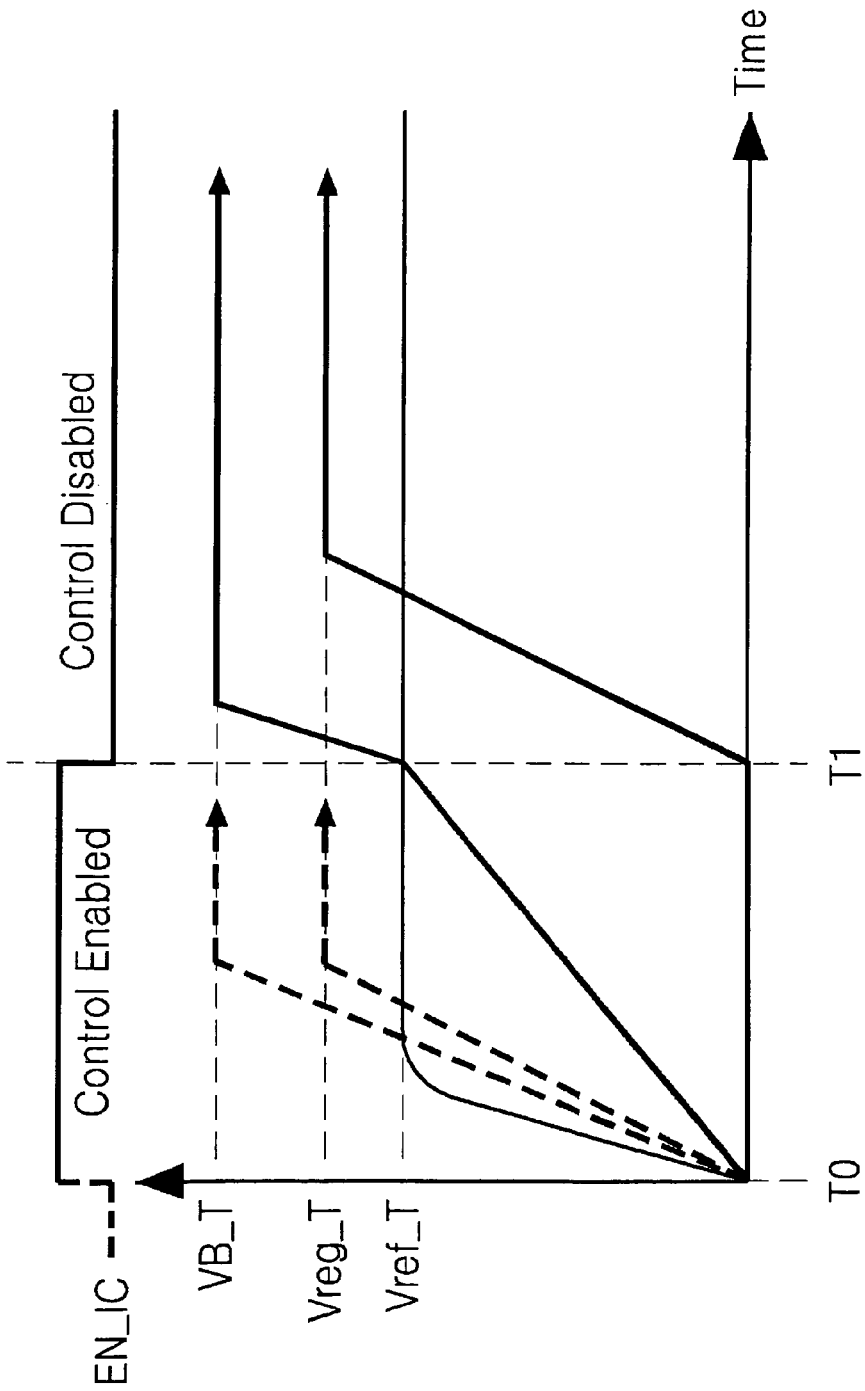
FIG. 7 is a graph showing a result of the comparison between the output signals of the boost circuit according to a related art and the boost circuit according to the exemplary embodiment of the present inventive concept.

FIG. 7 is a graph showing a result of the comparison between the output signals of the boost circuit 100 according to a related art and the boost circuit 500 according to the exemplary embodiment of the present inventive concept. Referring to FIGS. 1 and 7, a dotted line indicates the boosted voltage VB output from the boost pump 140 and the regulated voltage Vreg having a constant voltage level output from the regulator 150 of the boost circuit 100 of FIG. 1. Referring to FIGS. 5 and 7, a solid line indicates the boosted voltage VB output from the boost pump unit 550, the reference voltage Vref input to the inrush current control unit 570, and the regulated voltage Vreg having a constant voltage level output from the regulation unit 560 of the boost circuit 500 according to the present exemplary embodiment.

In FIG. 7, VB_T, Vreg_T, and Vref_T respectively denote target voltages that the boosted voltage VB, the regulated voltage Vreg having a constant voltage level, and the reference voltage Vref finally reach, in the boost circuit 500 according to the exemplary embodiment and the boost circuit 100 according to the related art.

In FIG. 7, T0 denotes a time point when power is supplied to the boost circuits (100 and 500) according to the related art and the present exemplary embodiment. T1 denotes a time point when the boost circuit 500 of the present exemplary embodiment terminates the control of inrush current, at which the level of the boosted voltage VB reaches the reference voltage Vref. In the period between T0 and T1, the inclination of the boosted voltage VB in the boost circuit according to the related art is greater than the inclination of the boosted voltage VB of the boost circuit 500 of the present exemplary embodiment. The time points at which the regulated voltages Vreg having a constant voltage according to the related art and the present exemplary embodiment start to rise are T0 and T1, which are different from each other. The grounds for the above difference will be described below in detail.

Since the pumping capacitors forming the pumping unit 140 of the boost circuit 100 according to the related art simultaneously perform pumping operations, the boosted voltage VB and the regulated voltage Vreg start to rise from T0. However, the pumping capacitors C1, C2, ..., Cn and C1', C2', ... Cn' of the boost pumping unit 550 of the boost circuit 500 according to the present exemplary embodiment are selectively driven in response to the inrush current control signal CS_IC and the inclination of the boosted voltage VB is smaller than that of the boosted voltage VB of the boost circuit 100 of FIG. 1.

Also, since the regulator 150 of the boost circuit 100 according to the related art performs a regulation operation from T0, the regulated voltage Vreg starts to rise from T0. In contrast, since the regulation unit 560 of the boost circuit 500 according to the present exemplary embodiment performs the regulation operation from T1 in response to the inrush current regulating control signal RCS_IC, the regulated voltage Vreg having a constant level starts to rise from T1.

Since the inclination of the boosted voltage VB in the period from T0 to T1 that is in the initial stage in which power is applied to the boost circuit 500 according to the present exemplary embodiment is smaller than that of the boosted voltage VB according to the related art, the amount of inrush current in the boost pump unit 550 is reduced. Also, since the regulator 570 is not operated in the section between T0 and T1, the amount of the inrush current may be considerably reduced.

In the present specification, the boost circuit 500 used as a power supply source of a drive buffer 600 buffering a drive signal of an image sensor 300 of FIG. 3 is mainly discussed. However, the boost circuit 500 may be used for other electronic devices needing a high voltage boosted from a power voltage, for example, a high voltage generation unit of a memory device.

As described above, according to the present inventive concept, the boost circuit is capable of reducing inrush current in the initial stage in which supply of power starts so that the overall system may be stably driven.

While the inventive concept has been particularly shown and described with reference to exemplary embodiments thereof, it will be understood that various changes in form and details may be made therein without departing from the spirit and scope of the following claims.

What is claimed is:

1. A boost circuit comprising:
a boost unit configured to perform a charge pumping operation based on an inrush current control signal to generate a boosted voltage, the boost unit including,
a regulation unit configured to selectively regulate the boosted voltage based on a regulating control signal; and
an inrush current control unit configured to generate the inrush current control signal based on the boosted voltage and a reference voltage, the inrush current control unit configured to generate the regulating control signal based on the boosted voltage and the reference voltage.

2. The boost circuit of claim 1, wherein the inrush current control signal is activated from a first time point when supply of power to the boost circuit starts to a second time point and deactivated after the second time point.

3. An image sensor, comprising:
a drive signal generation unit configured to generate a plurality of drive signals;
the boost circuit defined in claim 1;
a drive buffer unit having a plurality of buffers, each buffer configured to receive and buffer a corresponding drive signal, wherein at least one of the buffers is configured to receive output from the boost circuit; and
a pixel array having a plurality of pixels configured to be driven in response to the buffered drive signals.

4. A boost circuit comprising:
a boost unit configured to perform a charge pumping operation based on an inrush current control signal to generate a boosted voltage, the boost unit including,
an oscillator configured to generate a clock having a frequency,
a buffer unit configured to receive the clock, configured to buffer the received clock and inverted received clock, and configured to selectively output the buffered clock and the buffered inverted clock in response to the inrush current control signal, and
a boost pump unit configured to perform the charge pumping operation based on output of the buffer unit; and
an inrush current control unit configured to generate the inrush current control signal based on the boosted voltage and a reference voltage.

5. The boost circuit of claim 4, wherein the buffer unit comprises:
a plurality of buffers configured to buffer the received clock or inverted clock; and
a plurality of switching devices, each of the plurality of switching devices connected to a corresponding one of the plurality of buffers and configured to selectively output one of the buffered clock and the buffered inverted clock in response to the inrush current control signal.

6. The boost circuit of claim 5, wherein the plurality of buffers are parallelly connected to one another and each buffer is configured to buffer the received clock or the inverted clock.

7. The boost circuit of claim 4, wherein the boost pump unit comprises a plurality of pumping capacitors, each pumping capacitor configured to perform a charge pumping operation using the buffered clock or the buffered inverted clock.

8. A boost circuit comprising:
a boost unit configured to perform a charge pumping operation based on an inrush current control signal to generate a boosted voltage, the boost unit including a plurality of pumping capacitors configured to perform the charge pumping operation; and
an inrush current control unit configured to generate the inrush current control signal based on the boosted voltage and a reference voltage, the inrush current control unit configured to control the boost unit such that less than all of the plurality of pumping capacitors are used to perform the charge pumping operation from an initial time when power is supplied to the boost circuit until a desired time.

9. The boost circuit of claim 8, wherein the inrush current control unit controls the boost unit such that a greater number of the plurality of pumping capacitors are used to perform the charge pumping operation after the desired time than before the desired time.

10. The boost circuit of claim 9, further comprising:
a regulation unit configured to selectively regulate the boosted voltage based on a regulating control signal; and wherein
the inrush current control unit is configured to generate the regulating control signal such that the regulation unit does not regulate the boosted voltage before the desired time and does regulate the boosted voltage after the desired time.

11. The boost circuit of claim 10, wherein the desired time is when the boosted voltage reaches the reference voltage.

12. A boost circuit, comprising:
a boost unit configured to perform a charge pumping operation based on a control signal;
a regulation unit configured to selectively regulate the boosted voltage based on a regulating control signal; and
a controller configured to control the boost unit such that the boost unit performs a lesser charge pumping operation from an initial time when power is supplied to the boost circuit until a desired, time than after the desired time, the controller further configured to generate the regulating control signal such that the regulation unit does not regulate the boosted voltage before the desired time and does regulate the boosted voltage after the desired time, the desired time being when the boosted voltage reaches a reference voltage.

13. The boost circuit of claim 12, wherein the boost unit comprises:
an oscillator configured to generate a clock;
a buffer unit configured to buffer the clock; and
a pump unit configured to perform the charge pumping operation using the buffered clock.

14. A boost circuit comprising:
a boost unit configured to perform a charge pumping operation based on a control signal, the boost unit including,
an oscillator configured to generate a clock,
a buffer unit configured to buffer the clock, and
a pump unit configured to perform the charge pumping operation using the buffered clock, the pump unit including a plurality of pumping capacitors, and
a plurality of switches, each of the switches is configured to selectively supply the buffered clock to a corresponding one of the plurality of pumping capacitors based on the control signal; and
a controller configured to control the boost unit such that the boost unit performs a lesser charge pumping operation from an initial time when power is supplied to the boost circuit until a desired time than after the desired time.

15. The boost unit of claim 14, wherein the controller is configured to generate the control signal such that less than all of the plurality of pumping capacitors are used to perform the charge pumping operation from an initial time when power is supplied to the boost circuit until a desired time.

16. The boost unit of claim 15, wherein the controller is configured to generate the control signal such that a greater number of the plurality of pumping capacitors are used to perform the charge pumping operation after the desired time than before the desired time.

* * * * *